United States Patent

Berthold et al.

[11] Patent Number: 5,926,506
[45] Date of Patent: Jul. 20, 1999

[54] METHOD AND APPARATUS FOR AUTOMATICALLY RECOGNIZING A MODEM TYPE OF A MODEM CONNECTED TO TERMINAL EQUIPMENT AND FOR AUTOMATICALLY ADAPTING THE TERMINAL EQUIPMENT TO THE RECOGNIZED MODEM TYPE

[75] Inventors: Arndt Berthold; Andreas Wagner, both of Berlin, Germany

[73] Assignee: Francotyp-Postalia AG & Co., Birkenwerder, Germany

[21] Appl. No.: 08/748,187

[22] Filed: Nov. 12, 1996

[30] Foreign Application Priority Data

Nov. 13, 1995 [DE] Germany .............................. 195 43 075

[51] Int. Cl.$^6$ ...................................................... H04B 1/38
[52] U.S. Cl. ............................ 375/222; 364/900; 395/500
[58] Field of Search ...................................... 364/188, 238; 375/222, 231, 235; 395/200.54, 200.47, 838

[56] References Cited

U.S. PATENT DOCUMENTS

| | | |
|---|---|---|
| 3,255,439 | 6/1966 | Simjian . |
| 4,539,689 | 9/1985 | Chiu et al. .............................. 375/231 |
| 5,329,634 | 7/1994 | Thompson .............................. 395/500 |
| 5,732,212 | 3/1998 | Perholtz et al. ................... 395/200.11 |

FOREIGN PATENT DOCUMENTS

| | | |
|---|---|---|
| 0 285 390 | 8/1994 | European Pat. Off. . |
| 0 660 269 | 6/1995 | European Pat. Off. . |

OTHER PUBLICATIONS

"Method For Dynamically Determining Which Modem Is Installed," IBM Technical Disclosure Bulletin, vol. 29, No. 7, Dec. 1986.

Primary Examiner—Stephen Chin
Assistant Examiner—Joseph Roundtree
Attorney, Agent, or Firm—Hill & Simpson

[57] ABSTRACT

In a method and terminal apparatus for automatic modem type recognition and adaptation thereto within a communication mode, a microprocessor in a control unit of the terminal apparatus, is programmed to enter into a communication mode with a remote central data station in order to enter into a modem preselect value setting mode. The control unit is programmed so that the communication mode is exited after an automatic setup of the communication and after the execution of the communication. For automatic modem type recognition, modem-specific transmission sequences are stored in a program memory or in a modem initialization memory contained in a non-volatile memory of the terminal apparatus and are transmitted successively to the associated modem in steps, and the modem transmits its modem-specific response (transmission sequence) back to the microprocessor. The microprocessor then executes, in steps, a comparison of the response signals with the stored response signals for automatic modem type recognition. The recognized modem type is stored in non-volatile fashion in a modem detect memory. The microprocessor is programmed to execute a step to skip the recognition procedure if corresponding information about the modem type has been stored in the modem detect memory. The terminal apparatus may be a postage meter machine.

14 Claims, 5 Drawing Sheets

METHOD AND APPARATUS FOR AUTOMATICALLY RECOGNIZING A MODEM TYPE OF A MODEM CONNECTED TO TERMINAL EQUIPMENT AND FOR AUTOMATICALLY ADAPTING THE TERMINAL EQUIPMENT TO THE RECOGNIZED MODEM TYPE

BACKGROUND OF THE INVENTION

1. Field of the Invention

The present invention is directed to a method and arrangement for automatic modem type recognition and adaptation 2. Description of the Prior Art U.S. Pat. No. 3,255,439 discloses an apparatus for secure recrediting of a postage meter machine with a monetary balance that was already supplied with an automatic signal transmission, via data transmission equipment including a converter, from the postage meter machine to the central data installation, whenever a predetermined franked monetary amount, or a predetermined number of processed pieces of mail, or a predetermined period of time, was reached. Alternatively, a signal corresponding to the monetary amount, piece number or time period can be transmitted. The communication ensues by means of binary signals via converters connected with one another via a telephone line. The machine receives a likewise secured recrediting corresponding to the credit balance, and reverts to a locked condition if no credit is subsequently supplied. The fact that this known apparatus us limited to the sue of special converters for the signal transmission is disadvantageous.

A configurable interface for a postage meter machine is known from European Application 285 390. A modem is selectively controlled by the interface in order to transmit data between the postage meter machine and an apparatus, Not only secured data, but unsecured data as well, are to be transmitted between apparatuses. Since different special interfaces would be burdensome in a postage meter machine, and a new communication standard would not be able to be implemented without unavoidable delays, a general purpose communication port was provided.

A postage meter machine known from European Application 660 269 is equipped with at least one input means, an output means, an I/O control module, a memory device that contains the program register, data register, and in particular the accounting register, a control device, a printer module and a modem. The modem is a special data transmission apparatus for telephone networks. It is disadvantageous that only a predetermined modem type coupled to a particular interface is used. Variant postage meter machines are also commercially available with manual recrediting at the post office, which are however prepared for future connection with a central data station via a predetermined modem type. It is not acceptable to the user or lessee if it later turns out that the required type is no longer available or allowed. A subsequent reprogramming would have to be carried out using a reset EPROM, which is complicated and costly.

At present, there exists a constant increase in the demands made on a modem used in postage meter machines is to be noted. During each communication with the remote central data station, it is generally known to transmit the identity number of the postage meter machine and the values in the postal registers to the central data station for authorization before a recrediting a credit account. It has also been proposed that when a predetermined piece number of postage meter impressions is reached, a communication with the remote central data station is automatically initiated in order to recredit a piece number. In the future, modems with higher transmission rates will be available that allow the economical transmission of larger quantities of data. Modems used in postage meter machines will vary according to the different transmission rate requirements. Correspondingly, a program adaptation of the program stored in the postage meter machine would have to be carried out according to modem type, or according to whether a low-cost variant or a "luxury" security variant of the postage meter machine is used. On the other hand, no other modem type is usable even in case of repair, particularly if the program cannot be subsequently altered. The country-specific telephone apparatus likewise includes special technical features that are to be taken into account before a data communication takes place.

For electronic apparatuses, terminals or postage meter machines that are to be communicatively connected with remote data processing devices or other electronic unit, it is often desired that different types can also be built into or externally connected to special data transmission devices for telephone networks. In this area, a rapid development in modems is taking place, so that some modem types rapidly become obsolete and are no longer obtainable, or are no longer usable. Disadvantages include, e.g. for the different modem types, a highly fluctuating transmission rate and the different control sequences for the connection setup after a communication, or for connection dismantling after a communication. It is true that the connection protocol that occurs after a connection setup is largely standardized, and corresponds to the postal regulations in force and/or international recommendations in force. For each country there exist different regulations for the connection of telecommunication terminal equipment to the respective postal network. In contrast to the remote data processing installation or central data station, where a modem type can be used that can recognize and process the different connection protocol types, the required changes and modifications are more often necessary in the manufactured terminal equipment. In the manufacturing of electronic terminals, a large number of different modem types is used. Such terminals are to be used in various countries after being manufactured. Thus, a country-specific modem type adaptation and initialization must be undertaken each time, if a communication to the respective remote data processing device is to take place during later country-specific use. The retrofitting of an existing terminal with an external modem that is to be coupled with the existing interface thus cannot be carried out by the customer himself. Such a retrofitting with an external modem is particularly advantageous for postage meter machines that contain stored monetary data subject to consumption which must be replenished at time intervals.

SUMMARY OF THE INVENTION

An object of the present invention is to provide a method and an adaptation for a terminal of the type described above with which an adaptation of a terminal to a modem can be rapidly produced for different modem types, in particular for the purpose of data connection via a communication network to an external central data station. Another object is to provide measures for comfortable data input, i.e., that through the inventive adaptation, so that no increase in difficulty occurs for the user of the postage meter machine at the user interface with respect to recrediting.

A further object is to improve the initialization and operation of terminals or other electronic apparatus, such as for example postage meter machines, during or after their installation in the field, if these are to be retrofitted with a different modem type, or with an external modem, and adapted to a communication network.

The above objects are achieved in accordance with the principles of the present invention in a method and apparatus wherein the microprocessor of terminal equipment, such as a postage meter machine, is programmed to determine the modem type of a modem in or connected to the terminal equipment in a step after entry into a communication mode in preparation for conducting a transaction in which data will be transmitted via the modem, on the basis of the information stored in a memory region for a modem detect memory (MDS) in the non-volatile memory, this information being accessed by the program. If no corresponding information about the modem type is stored in the modem detect memory (MDS), a recognition procedure for the modem type is executed. The microprocessor of the postage meter machine is programmed to initialize an interface in the I/O control module and the connected modem, according to the stored modem type, before a central data station is dialed in the context of the communication mode.

An arrangement for automatic modem type recognition and adaptation within a communication mode includes a microprocessor in a control unit of the electronic apparatus (terminal or postage meter machine). The microprocessor is connected via an I/O control module with a modem and with means for triggering at least the entry into the communication mode. The modem is selectively controlled via an interface in order to transmit data. A non-volatile memory and a read-only memory ROM are connected with the microprocessor via a microprocessor bus, in order to provide the microprocessor with a program as well as program code, whereby the microprocessor is programmed so that the modem can be initialized. The aforementioned means that triggers the entry into the communication mode includes an input unit with a first predetermined key whose actuation triggers the entry into the communication mode. The read-only memory ROM contains stored modem-specific transmission sequences for a predetermined number of modem types. The non-volatile memory (NVM) has a memory region for a modem detect memory (MDS) which is accessed by the program. The electronic apparatus or terminal is programmed to initialize an interface in the I/O control module and the connected modem, in a manner corresponding to a modem type stored in the modem detect memory (MDS), before a central data station is dialed.

The inventive solution is based on the knowledge that modem types are distinguishable by means of:

company-specific technical hardware (e.g. switchable operation of a scale or of a modem via the same interface, or of a company-specific internal modem), country-specific technical requirements for the electrical connection of the interface to the communication network (e.g. concerning the maximum currents, voltage and resistances of telephone lines, and the allowance of special hardware features, such as, among others, the grounding key, as well as circuit parts for the operation thereof), which are defined in the country-specific postal regulations for postal allowance, initialization string, baud rate and country-specific protocol for connection setup (e.g. USA-Europe), access possibilities to the communication network (e.g. from branch exchanges or with the grounding key) by corresponding initialization of the modem and setting of dialing parameters.

According to the invention, a read-only memory ROM provides at least one external program code to the microprocessor of the terminal via the microprocessor bus, the program code containing the modem-specific transmission sequence. During the programming with the program, the program code is taken into account for a future retrofit. The option that a different modem type will be usable (e.g. in case of repair) is maintained by means of a corresponding number of program codes.

The inventive arrangement is suited for all electronic apparatus or terminals or postage meter machines that are supposed to communicate with a central data station via a modem, and which have a modem as well as a non-volatile memory, read-only memory ROM, and an I/O control module, which all connected to a microprocessor. The invention has the advantage that during installation of a different modem type no alteration need be subsequently carried out in the program of the terminal, even though different modem types are used.

During a recognition procedure, the inventive method proceeds on the assumption that the modem-specific transmission sequences stored in the postage meter machine are transmitted successively to the installed modem, and the modem transmits its modem-specific response (transmission sequence) back to the microprocessor of the postage meter machine, whereby the microprocessor carries out a comparison. The recognized modem type is stored in non-volatile fashion in the modem detect memory (MDS). It is additionally provided to skip the recognition procedure if a corresponding information about the modem type has been stored in the modem detect memory (MDS). This is usually the case when the recognition procedure for a modem used for communication has already been executed once and the result has been stored in a non-volatile manner. Otherwise a "no modem" message is present, which causes the microprocessor to carry out the above-named recognition procedure.

An input arrangement including at least first, second and third predetermined keys, is connected to the I/O control module. Actuation of the first predetermined key triggers the entry into the communication mode, including the aforementioned recognition procedure. Actuation of the second predetermined key confirms a desired input parameter, and automatically starts an initialization of the interface in the I/O control module and of the connected modem.

The microprocessor of the postage meter machine is programmed to initialize an interface in the I/O control module and the connected modem, in a manner corresponding to a stored modem type, before a central data station is dialed. In addition, after actuation of the third predetermined key a possibility for editing for a variable initialization string and parameter setting for a modem type is created.

DESCRIPTION OF THE PREFERRED EMBODIMENTS

The inventive arrangement in a terminal includes a control unit 6, such as a microprocessor, an I/O control module 4 having internal and/or external interfaces, a program stored in a read-only memory (ROM) 11 and a modem detect memory (MDS cells) contained in one or more non-volatile memory components 5a (NVM) and 5b (EEPROM) or in a time/date module 8. The non-volatile memory, the read-only memory 11, a main (volatile) memory 7 and the I/O control module 4 are connected to the control unit 6. At least one transmission device, such as a modem 23, is coupled to the I/O control module 4, for communicating with a central data station DC.

A modem type from a predetermined number of modem types is preferably used as the transmission device (modem 23). The arrangement (explained in more detail below for postage meter machines on the basis of FIG. 1) for automatic modem type recognition within a communication mode, is in principle suited for all electronic apparatuses or terminals or postage meter machines that are supposed to communicate with a central data station via such a modem.

Figure 1:
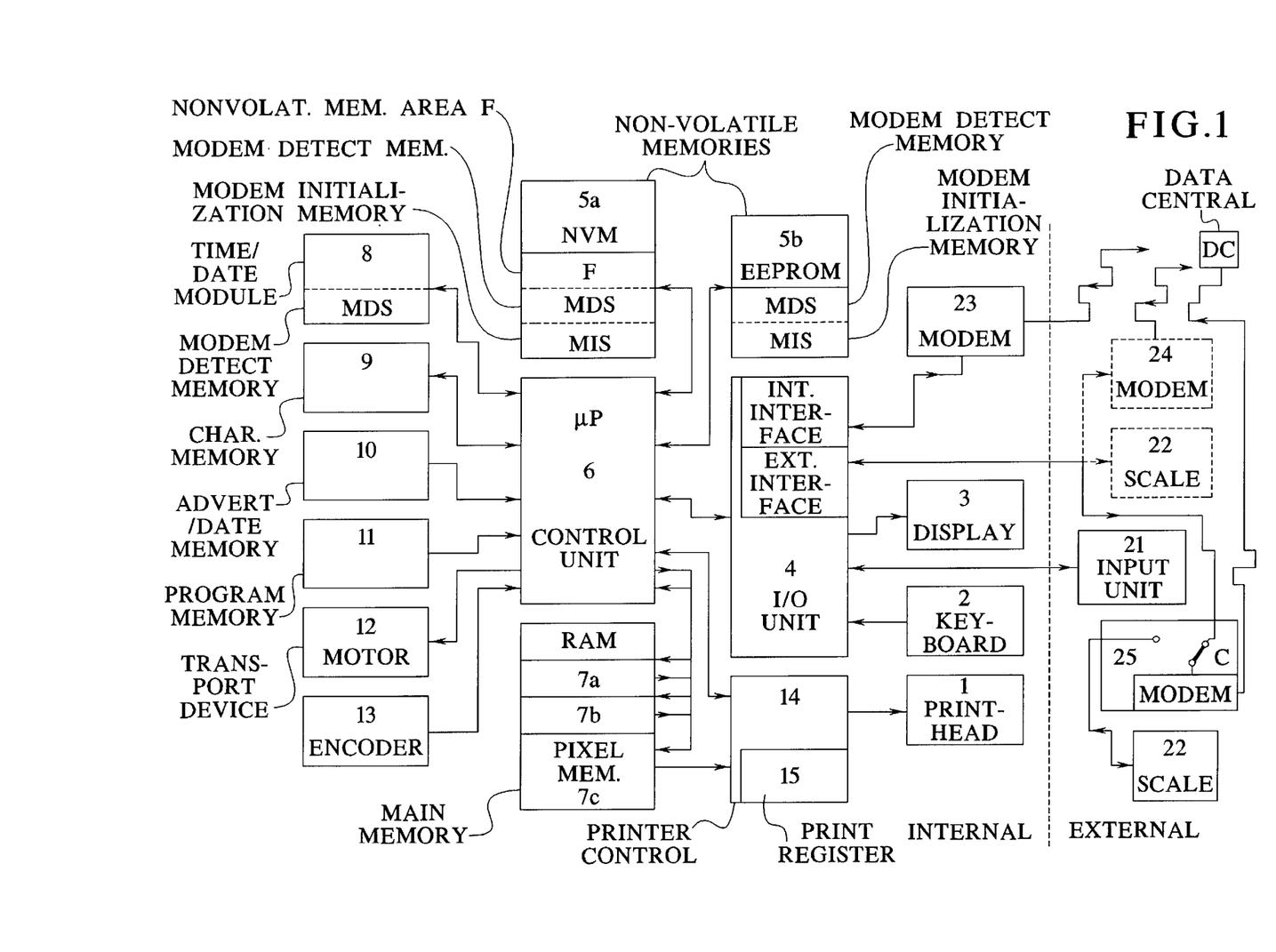
FIG. 1 is a block diagram of a postage meter machine with an inventive modem type recognition and adaptation.

The terminal shown in FIG. 1 is a postage meter machine with inventive modem type recognition and adaptation. The postage meter machine is equipped with a printer module 1 for producing a franking image fully electronically. The postage meter machine also has at least one input unit 2 with several actuating elements (such as a keyboard), a display unit 3. The internal modem 23 produces the communication with the central data station DC or with one of external modems 24 or 25. The postage meter machine can be equipped, if warranted, with an additional input unit 21 or scale 22, which are coupled to the control unit 6 via the I/O control module 4, and to the non-volatile memories 5a and 5band the constant parts of the franking image are stored in or are produced by a data memory 10 and a program memory 11 in collaboration with a character memory 9. The additional input unit 21 can likewise contain a transmission device (chip card write/read unit or mobile radiotelephone device). The I/O control module 4 includes corresponding internal and/or external interfaces. The character memory 9 supplies the necessary print data for the variable parts of the franking image to the volatile working memory 7. A discussion for the functioning of the main working memory areas 7a, 7b and 7c can be found in European Application 660 269, corresponding to co-pending U.S. application Ser. No. 08/346,909. The print data are transferred as needed to a printer control 14, which loads a print register 15 for controlling printing by the printer module 1.

The control device 6 may be a microprocessor μP, which is connected to the I/O control module 4, the character memory 9, the volatile working memory 7 and with non-volatile working memories 5a and 5b that comprise a cost center memory, the program memory 11. The control unit 6 is also connected to a motor of a transport (advance) device 12 (with tape triggering if warranted), an encoder (coding disk) 13, as well as with the time/date module 8. The individual memories can be several physically separate modules, or (in a way not shown) a few modules joined together. The memory module that includes the non-volatile working memory 5b can be, for example, an EEPROM secured against removal by means of at least one additional measure, for example gluing to the circuit board, sealing or embedding with epoxy resin. The data memory ASP 10 is preferably a pluggable EPROM module. The program memory PSP 11 and the character memory 9 are preferably realized in an additional EPROM module. The program memory 11 (EPROM) receives the larger part of the program code and provides the microprocessor forming the control unit 6 with an external program code via the microprocessor bus. At least one modem detect memory (MDS cells) and, if warranted, a modem initialization memory (MIS cells) are contained in one of the non-volatile memories 5a, 5b or 7.

It is inventively provided that the read-only memory (ROM) 11 is connected with the control unit 6 via a microprocessor bus, and provides a program as well as program code, which also includes modem-specific transmission sequences for a predetermined number of modem types for modems 23, 24 or 25. Also in accordance with the invention, the postage meter machine has a non-volatile memory NVM 5a or EEPROM 5b (or another non-volatile memory) that has a memory region for a modem detect memory (MDS), which is accessed by the program being executed by the control unit 6. This allows the postage meter machine to be programmed to initialize an interface in the I/O control module 4 and to initialize the connected modem 23 (or 24 or 25), in a manner corresponding to a stored modem type before the central data station DC is dialed. In this way, the flexibility with which modem types can be connected is increased.

In FIG. 1, connection variants for the internal modem 23 and for the external modem 25 are shown with a solid line and for the external modem 24 with a dotted line. The latter modem 24 can optionally be connected to an existing external interface provided for the scale 22. According to the signal sequence, it is recognized by the control unit 6 whether the scale 22 or the modem 24 is transmitting. The external modem 25 has a mode switch C permitting optional operation of the scale 22 or the modem 25. The mode switching is controlled by the control unit 6 via the I/O control module 4.

Alternatively, the modem 23 can be connected to an existing separate internal interface, which allows the operation of the scale 22 via the external interface. Depending on the existing connection to the interface of the I/O control module 4 and the signal sequence responded to, it is recognized by the control unit 6 whether and which modem type is connected. The data can be transmitted via modem to the central data station DC or transmitted back from the central data station DC, after the type of modem 23 or 24 or 25 has been recognized by the control unit 6 and the corresponding interface initialization and the dialing of the central data station DC has been carried out, and the communication connection has been established.

Figure 2:
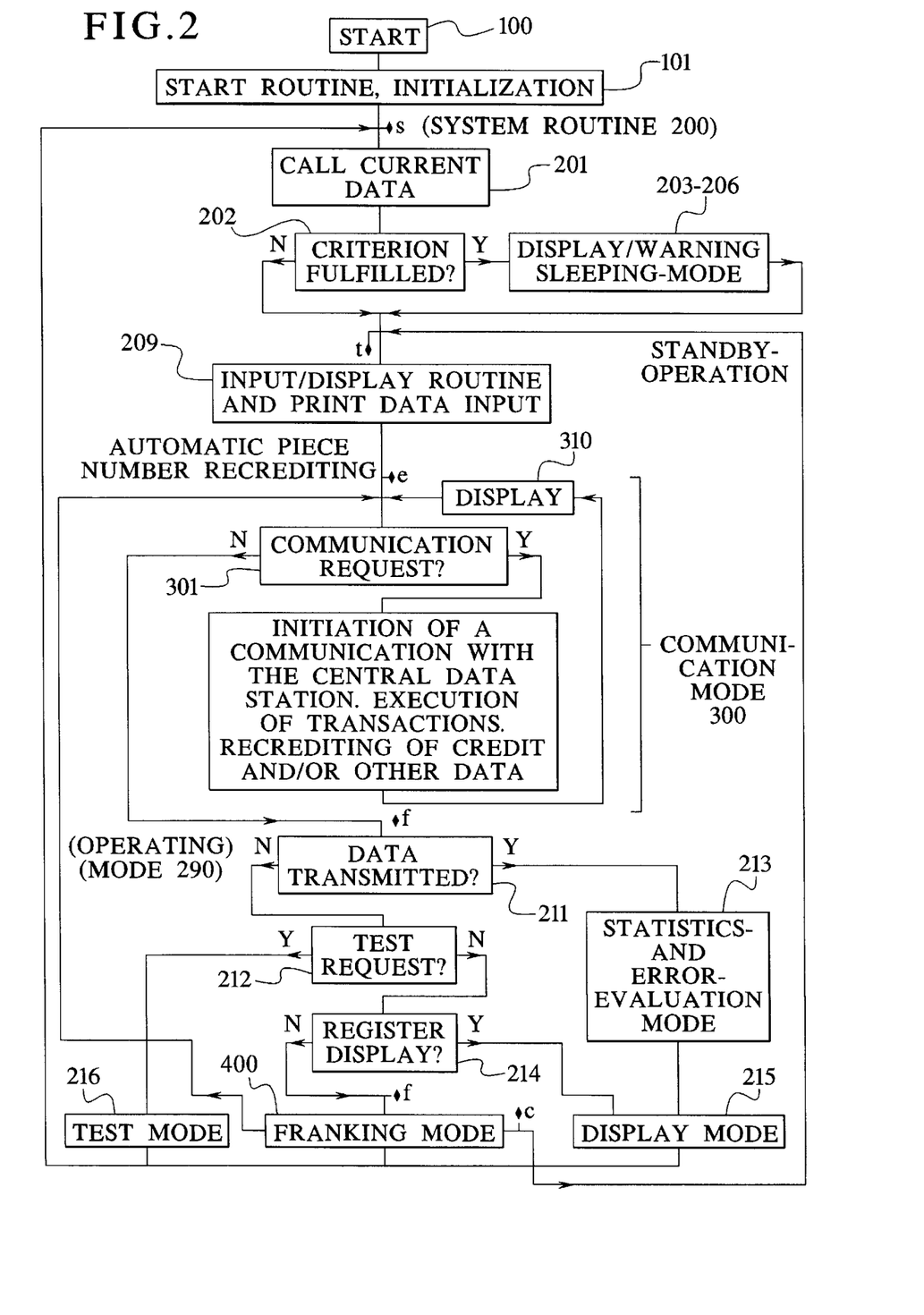
FIG. 2 is an overall flow diagram for controlling the postage meter machine of FIG. 1.

FIG. 2 shows an overall flow diagram for controlling a postage meter machine that includes a modem type recognition with corresponding interface initialization, initialization of the modem according to the modem type and dialing of the central data station, as well as the reception of the communication connection in a communication mode 300.

After the start 100, in step 101 substeps of a start routine and for the initialization of the postage meter machine are executed in order to then reach a system routine 200. As shown in FIG. 2, upon transition to the system routine 200, after a step 201 for calling data, in particular for sleeping mode piece number data, it is first checked in step 202 whether the criteria for entry into the sleeping mode are fulfilled. If this is the case, branching takes place to step 203, in order to indicate at least one warning on the display unit 3. Further steps 204 to 206 can be executed before branching takes place to step 209. If this is not the case, a branching likewise takes place to step 209. After these steps, the point t is reached in any case.

After a new input has ensued in the course of an I/O routine, which also includes a print data compilation and calling of the required image pixel data files in step 209, the point e, i.e. the beginning of a communication mode 300, is now reached, assuming that no relevant errors or faults have been determined. It is then queried in a step 301 whether a transaction request is present. If this is not the case, the communication mode 300 is exited, and the point f, i.e. the operating mode 290, is reached. If relevant data were transmitted in the communication mode 300, a branching then takes place to step 213 for data evaluation. In addition, it in step 213 a statistical and error evaluation is carried out in order to acquire additional current data, which can also be called after branching to the system routine 200 in step 201. If no relevant data were transmitted in the communication mode and the non-transmission is determined in step 211, a branching takes place to step 212 for the purpose of monitoring further operating inputs. It is now checked whether corresponding inputs have been made, in order to move into the test mode 216 given a test request 212, otherwise to move to a display mode 215 given an intended register state checking 214. If this is not the case, the point d, i.e. the franking mode 400, is automatically reached. If all columns of a print image have been printed, a branching back to the system routine 200 (point s) takes place.

The standby mode is reached when no input request or print request ensues for a predetermined time. The latter is the case when a letter sensor of a known type (not shown) determines there is no next envelope to be franked. The franking mode 400 (shown in FIG. 2) thus includes a query of a loop counter or timeout, which leads to point t again, and thus to the input routine according to step 209. If the query criterion is fulfilled, a standby flag is set and a branching takes place directly back to the point s to the system routine 200 or to the point t, without executing the billing and print routine in the franking mode 400. The standby flag is later queried in step 211 and is reset after a checksum test in step 213, assuming no attempt at manipulation is recognized. For this purpose, the query criterion in step 211 is expanded to include a query whether the standby flag is set, i.e. whether standby mode has been reached. In this case, a branching likewise takes place to step 213. The advantage of this method in connection with the first mode is that the manipulation attempt is statistically acquired in step 213.

A stored piece number is decremented upon each franking. If the piece number predetermined for franking was consumed by the preceding franking, i.e. the piece number now equals zero, a transaction request is automatically made, and a branching takes place from the franking mode 400 to the point e in order to enter the communication mode 300, so that a new predetermined piece number S is recredited by previous agreement with the central data station DC. In the case of an automatic branching to the point e, the required key actuation is simulated by the control unit 6 in order to enter into a communication with the central data station DC.

If the point e, i.e. the beginning of the communication mode 300, is reached, in step 301 it is queried whether a transaction request is present. Such a request, for example, can be set for credit balance and piece number recrediting, or updating of other relevant data. The transaction, if requested, takes place in step 302.

For a manual transaction request, the user selects the communication or the remote value preselect mode of the postage meter machine by entering the identification number (eight-place postage call number) and actuating a first predetermined key (postage value key). If the desired input parameter is correctly displayed, this is confirmed by a renewed actuation of the predetermined first key or by actuation a second predetermined key (R key) of the input unit 2. Otherwise, an editing takes place as needed before a confirmation of the input parameters. A display corresponding to the input then appears on the display unit 3.

By actuation of the second predetermined R key, the transmission of the input parameter is started via a modem connection after the input has been checked. The rest of the process is executed automatically, with the execution being accompanied by a corresponding display.

A transaction carried out with encoded messages during the communication includes a preselected value for a recrediting value, which is transmitted to the remote central data station DC, and/or that another transaction is carried out with encoded messages during the transaction includes a specific piece number S' for entry into a sleeping mode.

Figure 3:
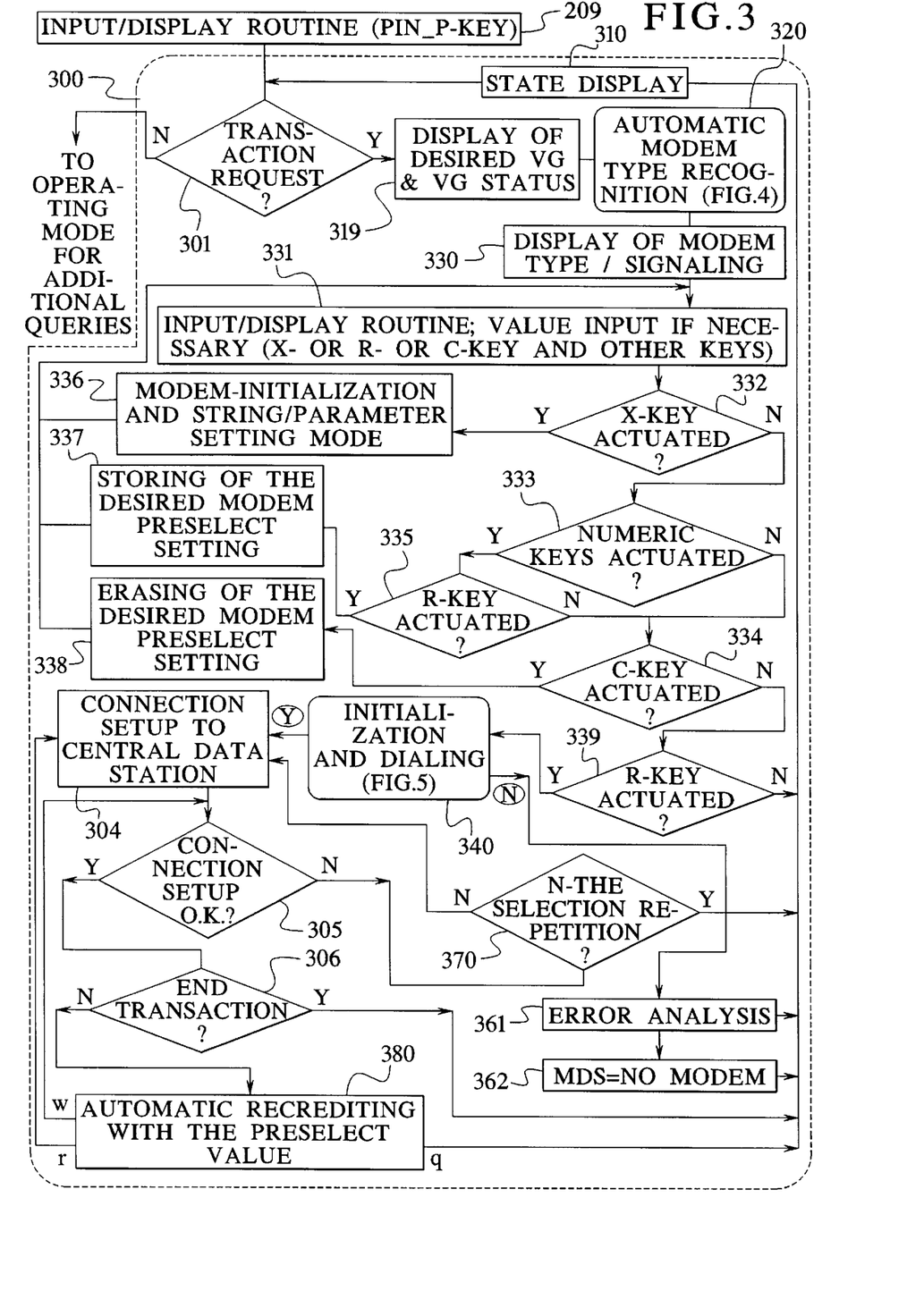
FIG. 3 is a detail of the overall flow diagram for controlling the postage meter machine upon reaching the communication mode with modem type recognition.

FIG. 3 shows a detail of the flow diagram for controlling the postage meter machine, shown at the point of reaching the communication mode 300, for modem type recognition. From the operating mode, the postage meter machine is switched to the communication mode 300 by means of the input of the postage call number PAN or identification number PIN, and confirmation by actuation of a first predetermined key of the input unit 2. The postage meter machine thereby recognizes a transaction request and switches to the communication mode 300.

It is inventively provided that the control unit (microprocessor) of the postage meter machine is programmed to determine the modem type after entry into a communication mode before the initialization of the connected modem. This takes place in a step 340, on the basis of information stored in one or both non-volatile memories 5a and 5b in a memory region for a modem detect memory (MDS). This information is accessed by the program being executed by the control unit 6. A modem type recognition procedure, with storage of corresponding information about the modem type, is carried out in step 320 before the initialization of the connected modem according to the stored modem type only if it is previously recognized in substep 3250 that no corresponding information about the modem type was stored in the modem detect memory (MDS).

If an automatic test has recognized valid data, after the modem type recognition and, if warranted, after a modem preselect value setting mode, an interface initialization ensues, as well as the inventive modem initialization, and then an automatic dialing of the central data station DC before a communication connection setup.

A recrediting process can be carried out in a transaction with the recrediting value corresponding to the desired preselected value, which was already entered earlier in a modem preselect value setting mode and stored in a non-volatile manner. If in the context of a preceding input and display routine the above-identified key, or another special key of the input unit 2, was correspondingly actuated, i.e. without a preceding transaction for altering the desired preselected value, a transaction is carried out with the recrediting value corresponding to the earlier desired preselected value.

As shown in FIG. 2, the franking mode 400 is reached after running through additional query steps 211, 212 and 214 for the recognition of fulfilled criteria or data inputs that arrive after the execution of the communication mode in the sequence, in order then to branch again, via the system routine 200 and an input and display routine with insertion of print data in step 209, to the query step 301 for recognition of a transaction request. After input of the PIN and the actuation of the first predetermined ("postage value") key in step 209, the transaction request is recognized in step 301, and the remote value preselect status '1' is displayed in step 319 along with the stored last preselect value or the desired preselect value.

In a variant embodiment, modified over the product disclosed in European Application 660 269, a modem remote value preselect ensues in step 380, if the ending of the transaction was not determined in the previous step 306 and a branching back to the state display at step 310 did not take place. Before these steps, the inventive routine 320 for modem type recognition is executed and a step 331 is reached in which a setting of the preselect value or confirmation of the preselect value (steps 331 and 333 to 339) or setting of variable initialization strings or parameters (steps 331, 332, 336) can be carried out. According to the invention, in step 336 there is a possibility of switching to a setting mode for the variable initialization string or parameter. A switchover to the setting mode for the variable initialization strings or parameters in step 336 is reached by actuation of a third predetermined ("X") key instead of the second predetermined R key. Either the actuation is determined in step 332 or a branching takes place to step 333. The setting of the value in step 333 ensues by means of the numeric keys of the input unit 2 must be terminated or confirmed with the second predetermined R key in step 335 in order to cause storing of the desired modem setting in the postage meter machine. Otherwise, a branching takes place to step 334. If input errors are visible via the display unit 3 during input checking, the input of the value or the valve of the desired modem setting value can be erased by actuation, determined in step 334, of a fourth predetermined ("C") key in step 338. If, after execution of step 339 no valid input or operator action can be determined by the postage meter machine, a branching takes place back to a state display in step 310. After the execution of steps 336, 337 or 338, a branching back to step 331 takes place.

If it is recognized in step 339 that the second predetermined ("R") key was activated, the postage meter machine checks in step 340 (shown in FIG. 3) whether a stored modem type is addressed and initialized, before a step 304 for the setup of a communication connection to the central data station DC is reached. If no modem is connected or ready for operation, a branching takes place from step 340 to step 310 via steps 361 or 362, in order to indicate that there is a modem initialization error (hardware or software error), or in order to indicate that, if warranted, the transaction request must be repeated. Otherwise, the postage meter machine reads the dialing parameters, consisting of the selection parameters (main/branch exchange, etc.) and the telephone number from the area F of the memory 5a, and transmits these to the modem 23 or 24 or 25. Subsequently in step 304 the connection setup required for the communication with the central data station is made via the modem 23 or 24 or 25, and a check of this setup is made in a step 305. Given absence of a connection, a branching back to step 304 takes place via step 370 for the repetition of the dialing. After a determination in step 370 of a predetermined number n of unsuccessful dialing repetitions for the purpose of attempting a connection setup, a branching back to the point e takes place via a display step 310.

Figure 4:
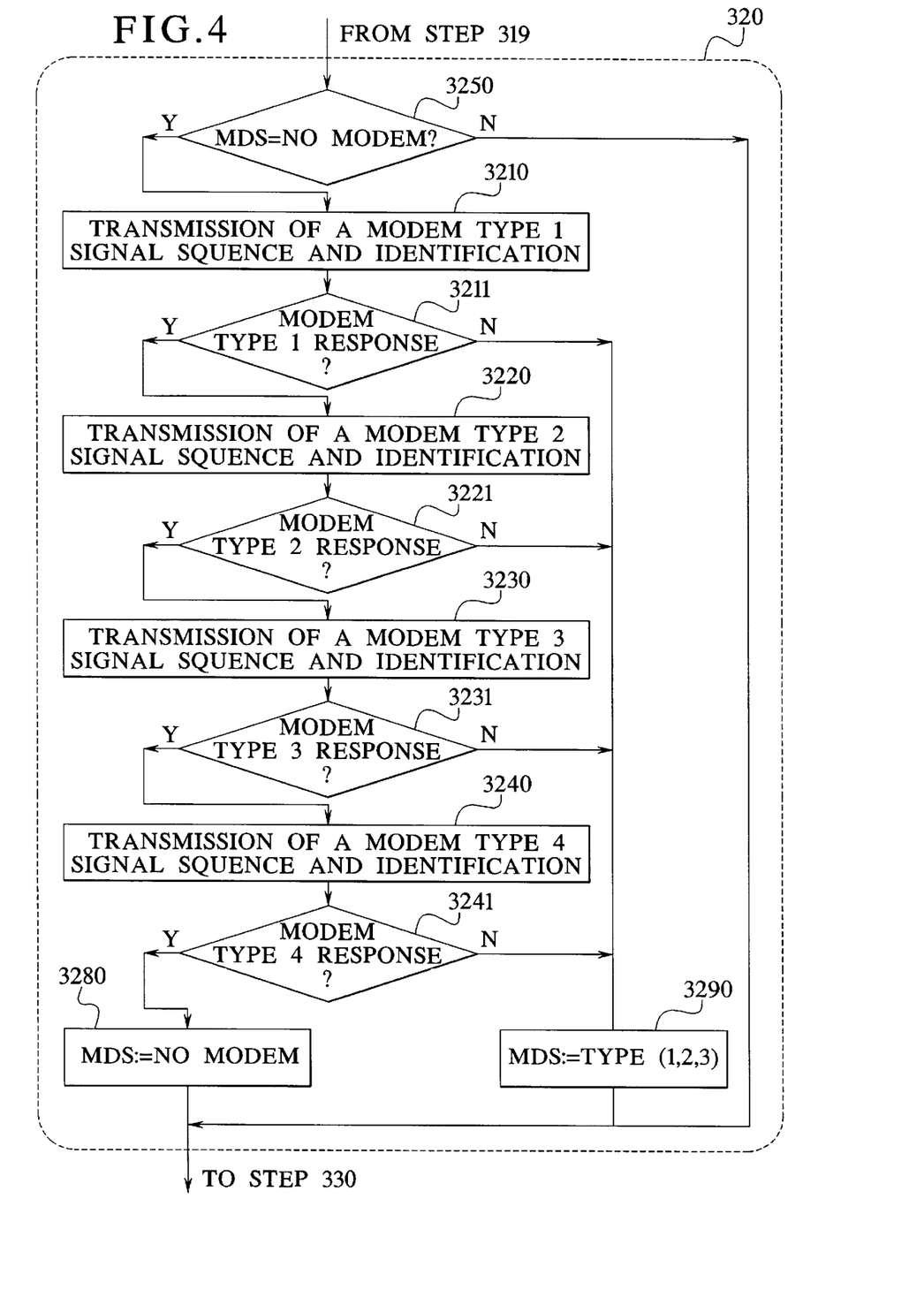
FIG. 4 is a flow diagram for the modem type recognition in accordance with the invention.

In FIG. 4, a flow diagram for the modem type recognition routine according to step 320 is shown in more detail. A part of the program code required for the operation of a postage meter machine is stored in the program memory (EPROM) 11. Program code is provided to the control unit 6 via the microprocessor bus. A program code required for the operation of a postage meter machine with modem type recognition is called after the query step 301, i.e. if a transaction request caused manually through keyboard input is determined, or if an automatic transaction request caused by the reaching of the piece number criterion queried in the franking mode is determined. In the non-volatile memories 5a or 5b, or in another non-volatile memory (for example in the time/date module 8), a memory region for a modem detect memory (MDS) is present, which is accessed by the program. In step 320 an automatic modem type recognition in the form of a software routine implemented in the postage meter machine can thus be executed. This routine sends modem-specific transmission sequences successively to the modem via a V24 interface before a remote value preselection, and awaits the modem-specific response. The modem type is detected by a comparison indicating agreement of the target response and the actual response.

It is first checked in step 3250 whether the execution of a recognition procedure for modem type recognition is required, i.e. whether the entry in the memory MDS="no modem". If this is the case, in step 3210 a predetermined first modem type identification is carried out by sending a first signal sequence to the modem by the control unit 6, and upon recognition by the modem a response signal is triggered that is evaluated by the control unit 6. In step 3211 it is checked whether an identification of the first modem type is present. If this is the case, a branching takes place to step 3290. Otherwise, a branching takes place to step 3220.

In step 3220, a predetermined second modem type identification is carried out, by sending a second signal sequence to the modem by the control unit 6, and upon recognition by the modem a response signal is triggered that is evaluated by the control unit 6. In step 3221 it is checked whether an identification of the second modem type is present. If this is the case, a branching takes place to step 3290. Otherwise, a branching takes place to step 3230.

In step 3230, a predetermined third modem type identification is carried out, by sending a third signal sequence to the modem by the control unit 6, and upon recognition by the modem a response signal is triggered that is evaluated by the control unit 6. In step 3231 it is checked whether an identification of the third modem type is present. If this is the case, a branching takes place to step 3290. Otherwise, a branching takes place to step 3280, if necessary via additional steps 3240 and 3241.

Continued in this way, a recognition can be carried out on the basis of several stored modem-typical sequences, whereby in step 3290 the corresponding type (for example 1, 2 or 3) is entered in the non-volatile memory 5a of the postage meter machine. This information is stored so that if warranted the recognition procedure can be omitted before additional remote preselections by modem.

In step 340 (FIG. 3), the program code for the modem-specific control sequences (basic initialization, connection setup) is then applied in accordance with the recognized modem type. In a variant, the content of the program memory 11 is used for the basic initialization and the connection setup. In another variant, only the content of the memory MIS (in memory 5a or 5b) is used for the basic initialization and the connection setup.

Upon reaching step 3280, for example a "no modem" type is detected, which indicates, for example, an unknown modem. The information "no modem" is thus entered in a modem detect memory (MDS) in memory 5a or 5b.

The modem type recognition routine 320 is called after entry into the communication mode 300 at the beginning of the remote value preselect procedure. For this purpose, it is first checked whether the information "no modem" was entered in the modem detect memory cell, or whether the information for modem type 1, 2, 3, . . . , was erased or the modem type is stored. This should be carried out in the basic initialization, e.g. in the manufacturing plant of the postage meter machine (e.g. by means of a reset EPROM). A non-erased modem detect memory cell contains, for example, the information concerning modem type 1, 2 or 3, and thus causes a skipping of the recognition procedure, since it is assumed that such a procedure was already carried out at an earlier time.

An erased modem detect memory cell, or a cell with the entry of the information "no modem", causes the modem type recognition routine to be called, in which (as shown in FIG. 4) for example three modem-specific control sequences can be called successively, or it is checked whether MIS values are entered in the modem initialization memory MIS.

In the modem recognition procedures, a control sequence is transmitted to the modem, which sequence must be specifically responded to by the modem within a limited time for a positive recognition. The modem-specific responses of modem type 1 and modem type 2 are respective sequences defined by the postage meter machine manufacturer and are permanently stored in the modem. The response modem type 3 or modem type 4 respectively stand for predetermined or variable modem configurations, and the response modem type 5 stands for a non-recognized modem type or for "no modem."

After its recognition, the modem type can be shown on the display. With simultaneous acoustic signaling, e.g. by means of a beeper "modem 1" can preferably be displayed for a predetermined time duration of one second in step 330 (FIG. 3).

After this, beginning with step 331 for input and display, the actual remote value preselection procedure is called, in which, after the input query (steps 332 to 339), in a step 340 modem-specific initialization sequences are transmitted via the associated V24 interface, and the modem-specific program functions required for the basic initialization and, in step 304, for the connection setup of the modem, are carried out.

The integration of a variable modem configuration for modem type 4 in the modem type recognition for an external crediting presupposes that before the start of a connection, the modems must be matched to the hardware characteristics of the V24 interface, to the transmission method, to the desired user behavior, to the crediting-specific requirements and to the desired software behavior, by sending the corresponding configuration commands to the modem via the V24 interface.

In conventional applications, in a first variant this configuration profile is contained in a non-volatile memory in the modems, which is stored with reference to values, i.e. at the value side, or with reference to the user, i.e. at the user side, and is activated after every RESET. In a second variant, before the selection command string the configuration profile is transmitted to the modem with corresponding commands.

Modems of different manufacturers differ from one another by a differently implemented set of commands. Due to constantly increasing demands made on modems, in the future an expansion of the command sets will be necessary, which will then be used in a partially manufacturer-dependent manner. In order to organize the automatic modem recognition method for modems that are to be connected externally in a manner that will be useable in the future, according to the invention an adaptation of the configuration string is carried out by the operator or service technician in a modem type 4 of the modem type recognition. The postage meter machine need not be opened for the purpose, e.g., of equipping the machine with a new program (ROM).

The input of the variable configuration commands can ensue in at least two ways:

1. Master/technician EPROM
2. Manual input method

In the first type, the configuration command is contained in a master/technician EPROM. This EPROM is already used in a known way as an actuating means in order to carry out the first initialization of a postage meter machine, for example a telephone number is stored in the non-volatile memory 5a of the postage meter machine. In addition, with the storage of the telephone number the configuration string of the master/technician EPROM is now automatically stored in the specific memory region MIS of the memory 5a.

In the second type, i.e. in the manual input method, the modem commands include the entire ASCII character set. With an actuating element of the input unit means 2, e.g. a third predetermined ("X") key of a keypad, in step 332 a switchover takes place to allow the possibility of entering a maximum of 128 characters in step 336 (FIG. 3). Thus, the operation provides a confirmation with the first predetermined ("P") key after the PIN input, and provides the actuation of the third predetermined ("X") key after a corresponding display. The commands are then entered as 3-place decimal numbers, and an actuation of an additional predetermined key causes a takeover (entry enable) and marks the character division. The character division between the decimal inputs in an ASCII character string is, for example, carried out with the second predetermined ("R") key with the display of a hyphen (example: 092-078-031 for the character string N1). In another variant, the hyphen can be replaced by a period, whereby a ten-place display unit suffices for the display of the entered character string. With the actuation of the first predetermined ("P") key, the entire numeric string is converted into an ASCII character string and is transmitted into the modem initialization memory (MIS) of the non-volatile memory 5a (NVRAM).

Figure 5:
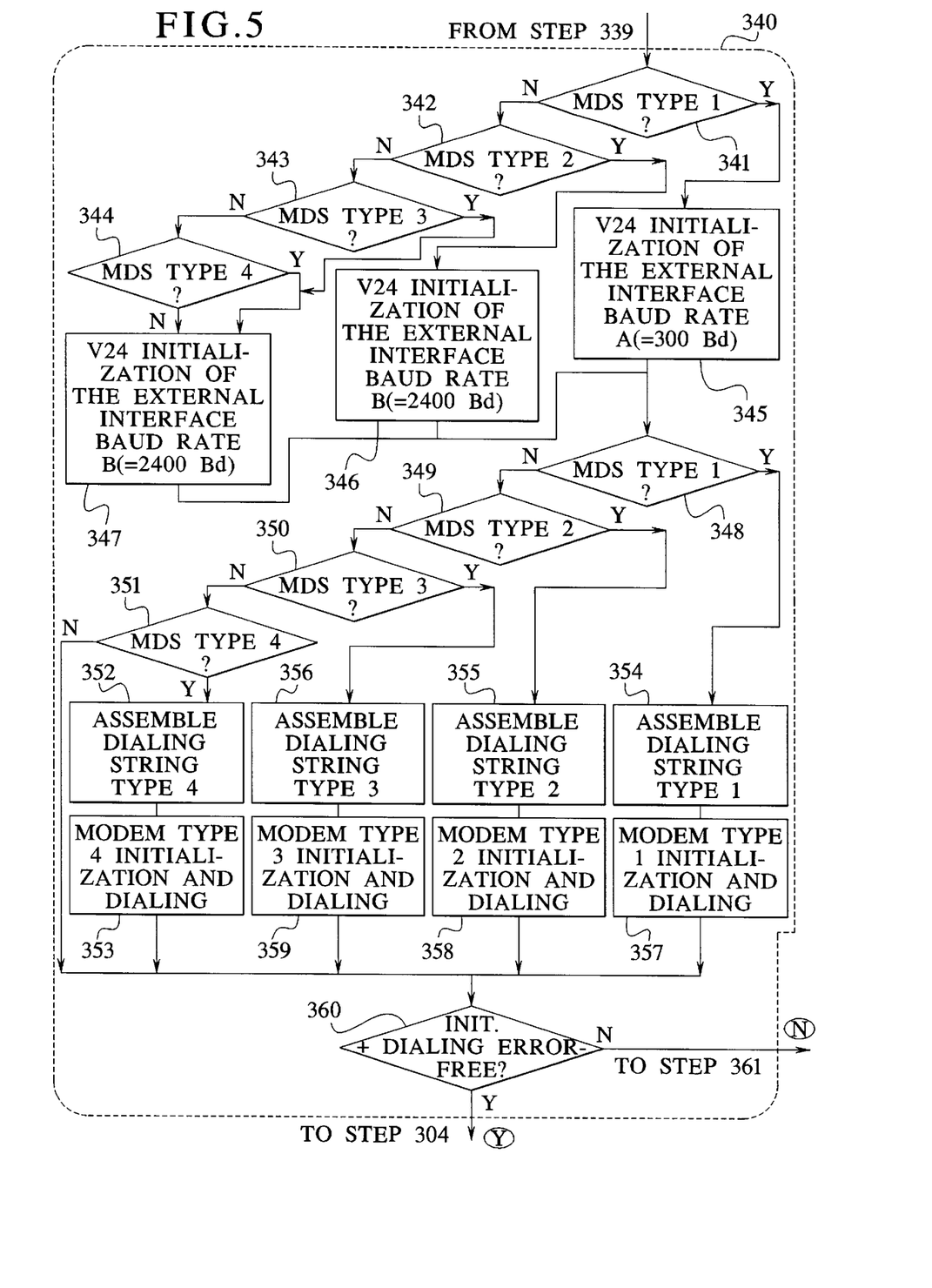
FIG. 5 is a flow diagram for initializing the interface and the modem and dialing the central data station in accordance with the invention.

In the case of a modem initialization of an externally detected modem, specified on the basis of FIG. 5, this ASCII character string is built into the configuration instruction transmitted to the modem. A set of commands for such a configuration instruction consists preferably of five parts K1 to K5:

| Command set part | Brief designation | Stored in |
| --- | --- | --- |
| K1 | standard initialization | Program Memory 11 (ROM) |
| K2 | variable configuration | MIS in the NVRAM 5a |
| K3 | selection command | Program Memory 11 (ROM) |
| K4 | selection parameter | area F in the NVRAM 5a |
| K5 | telephone number | area F in the NVRAM 5a |

FIG. 5 shows, in greater detail, a flow chart for initialization of the interface and of the modem and for dialing the central data station according to step 340. Corresponding to the detail of the overall flow diagram shown in FIG. 3, upon the reaching the communication mode 300 there ensues within step 340 a test at the postage meter machine in a substep 360 to determine whether initialization of the modem and dialing the central data station could be carried out without error. This allows, in the following step 361, the error source to be identified, e.g. whether a modem is not connected or is not ready for operation. In case of error, a branching takes place from the substep 360 via step 361 for error analysis, and via a step 362 for storing the state as modem type 5 or "no modem," back to the step 31 0, in order to indicate the presence of a hardware error (if no modem is connected), or a defective modem, or the presence of a software error (if the modem is not ready for operation). If there are no errors, a branching takes place from the test step (substep 360) to a step 304 for the setup of a communication connection to the central data station DC.

A query of the modem detect memory MDS is carried out by the postage meter machine in steps 341, 342, 343 and 344 with respect to a test of the modem type, in order to initialize the corresponding V24 hardware interface and in order to branch to additional query steps 348 to 351.

The query steps 343 and 344 are shown in FIG. 5 in order to open the possibility of an expansion of the sequence to include a larger number of modem types. In step 341, a test of the modem type 1 is carried out in order to branch to an initialization step 345 upon recognition of this modem type. In step 342, a test of the modem type 2 is carried out in order to branch to an initialization step 346 upon recognition of this modem type. In a preferred embodiment, the query steps 343 and 344 can be omitted, since a branching is to take place anyway to the initialization step 347 if modem types 3 or 4 are present.

The control unit 6 of the postage meter machine is programmed to carry out an interface initialization in a step 345, 346 or 347 in a predetermined manner.

Preferably, it is additionally provided that the V24 interface initialization is carried out allocated to the recognized modem type and/or correspondingly allocated to an arrangement at a predetermined interface of an I/O control module 4 of the postage meter machine as an external or internal modem and/or correspondingly allocated to the corresponding baud rate of the modem type, whereby the allocation is stored in a non-volatile manner in a memory region thereof.

After the interface initialization, the respective query steps 348, 349 or 351 are reached for the respective modem type. After this, the control unit proceeds further in a modem-specific manner according to a program. The control unit 6 of the postage meter machine is programmed to determine the modem type in a step 348, 349, 350 or 351, and to assemble a corresponding dialing string in a step 354, 355, 356 or 352 in order to dial the central data station DC, as well as being programmed to initialize the modem according to type in a step 357, 358, 359 or 353 before causing dialing corresponding to the modem type.

If no allocation to the modem types stored in the postage meter machine can be determined, a branching takes place from the query step to the modem type 4 (step 351) directly via the additional error query step 360 for error analysis in step 361, in which it is determined on the basis of additional stored or detected data whether a hardware or software error is present.

In a variant embodiment of the method for automatic modem type recognition within a communication mode, the control unit 6 of the postage meter machine is programmed so that it determines the modem type in a step 320 exclusively on the basis of the information stored in a memory region for a modem detect memory (MDS) in the non-volatile memory NVM 5a or EEPROM 5b or another non-volatile memory such as the time/date module 8, the information being accessed by the program.

The postage meter machine is programmed so as to initialize an interface in the I/O control module 4 and the connected modem 23, 24 or 25 corresponding to the stored modem type before the central data station DC is dialed. Upon reaching the communication mode 300, a test ensues at the postage meter machine in substep 360 of whether a modem is connected and ready for operation (positive case), before, in the positive case, a step 304 for the setup of a communication connection to the central data station DC is reached.

As explained above on the basis of FIG. 3, after the entry of the PIN and the actuation of the first predetermined 'postage value' key, there are displayed the PIN, and in step 319 the stored preselected value, and the preselect status "1", and in step 330, if warranted, "MODEM 1," for a time period of at least a time frame (seconds) during which the procedure is being executed. In step 331, an input with corresponding display can be carried out.

In a variant embodiment (not shown in more detail in the figures) with several remote value preselect variants, there subsequently ensues, after the entry of the PIN and the actuation of the first predetermined "postage value" key, a recognition of the transaction request. Before the recognition of the modem type in step 320, an additional step 319 can be executed. There ensues after step 320, in step 330a, an actuation of the first predetermined ("P") key, in order to move into the first communication mode with modem preselect, or there subsequently ensues an actuation of the second predetermined ("R") key, in order to move into the second communication mode with Voice 2 preselect, or there ensues an actuation of the third predetermined ("X") key and a corresponding query in step 332 in order to move into the setting mode for variable initialization strings and parameters in step 336.

In another variant of the program execution, it is provided to carry out additional inputs for setting dialing parameters for adapting the respective modem to the telephone equipment of the customer. For this purpose, an additional query step 332a (not shown in FIG. 3) is inserted before the query step 332 in FIG. 3. This query step 332a determines whether an additional fifth ("SET") key has been activated, in order to move into a dialing parameter setting mode 332b, from which a branching takes place back to step 331 of the I/O routine.

In the setting mode 332b for the dialing parameters, the stored dialing parameter configuration is displayed with a leading 'd'. The 'd' indicates that the postage meter machine is in the dialing parameter input mode. There ensues either the display of the stored dialing parameters and their alteration, for which purpose a fourth predetermined ("C") key is to be actuated, or, after the actuation of the fifth predetermined ("SET") key, the postage meter machine moves back to step 331. Upon alteration of the stored dialing parameters through the pressing of the fourth predetermined ("C") key, the display is erased and a left-justified ("d") is displayed. A new configuration can now be entered. Errored inputs can be erased with the fourth predetermined ("C") key. If the fourth predetermined ("C") key is actuated when the display is blank, the mode is exited without altering the stored configuration. The new configuration is stored by a renewed pressing of the fifth predetermined ("SET") key, and the postage meter machine again moves back to step 331.

The dialing parameters serve for adaptation of the respective modem to the customer's telephone equipment. A complete dialing set consists of a customer-individual dialing parameter and a constant telephone number. The dialing parameters indicate to the modem how it is to reach a trunk (exchange) line, and which type of dialing is to be used for this purpose. According to the inventive solution, the dialing parameter inputs are organized in a user-friendly manner. The dialing type (pulse/tone) must be entered as the first input. The input is possible in the operational mode with respective actuating elements, with simultaneous alphanumeric display for the dialing parameters, e.g. the dialing type (pulse dialing "P" or tone dialing "t"), the state of waiting for a dial tone "U", the state of a pause of ca. 2 seconds "-", the state of possible contacting of the exchange with the grounding key "E" or with the flash key "F", or the state of dialing without contacting the exchange by a branch exchange without an exchange tone "n" and possible contacting of the exchange an entry with "0" to "9". After the input "waiting for dial tone," no further input is possible. The following examples of inputs that make sense result:

1) dt main connection with tone dialing;
2) dP main connection with pulse dialing;
3) dt8U branch exchange with tone dialing, selection via 8, waiting for the dial tone;
4) dtF branch exchange with tone dialing, selection via flash key, pause before dialing telephone number;
5) dt8-8U branch exchange with tone dialing, selection via 8, pause, 8 and waiting for dial tone; and
6) dt0n branch exchange with tone dialing, selection via 0, no dial tone expected.

Nonsensical inputs are also possible, e.g. "dtU", "dt0nU". In a variant of the program execution, it is provided to compare these inputs with stored errored inputs in order to signal nonsensical inputs to the user, or in order to refuse the storage of such inputs.

An editing of telephone numbers can also be carried out manually, by means of editing input steps 332*d* to 332*g* ensuing via an additional query step 332*c* before a branching takes place back to step 331.

Additional inputs or measures for adaptation can be executed analogously to the input of the variable modem initialization string in the MIS according to the same method. After a query of the input criterion, a branching takes place to a program execution step for the adaptation of the respective modem to the customer's telephone equipment. An automatic adaptation is achieved by simulation of the input or simulation of the key actuation by the stored program. It is provided to program the control unit 6 of the electronic terminal, to carry out an automatic adaptation of the respective modem type to the telephone equipment after simulation of the input or the key actuation.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for automatically recognizing a modem type connected to a terminal apparatus and for adapting the terminal apparatus to the recognized modem type, in a terminal apparatus which communicates with a remote central data station, the terminal apparatus having a control unit and a currently-used modem in electrical connection via an interface with said control unit, said currently-used modem being of a modem type among a plurality of different modem types, said method comprising the steps of:

entering into a communication mode between said terminal apparatus and said central data station in which data is to be transmitted via said currently-used modem, for which initialization of said currently-used modem by said control unit is required;

after entry into said communication mode and before initialization of said currently-used modem, identifying, via said control unit, the modem type of said currently-used modem by interrogating a modem detect memory to determine if information corresponding to the modem type of said currently-used modem is in said modem detect memory;

if no information corresponding to the modem type of said currently-used modem is in said modem detect memory, obtaining and storing in said modem detect memory information corresponding to the modem type of said currently-used modem;

initializing said currently-used modem; and exiting said communication mode.

2. A method as claimed in claim 1 wherein the step of obtaining and storing information corresponding to the modem type of said currently-used modem comprises the steps of:

(a) storing a plurality of modem-specific transmission sequences respectively corresponding to said different modem types;

(b) storing a plurality of modem-specific responses respectively for said modem-specific transmission sequences;

(c) checking in said control unit to determine if information corresponding to said currently-used modem is in said modem detect memory and, if so, proceeding to the step of initializing said modem and, if not, proceeding with steps (d), (e), and (f);

(d) transmitting one of said modem-specific transmission sequences from said control unit to said currently-used modem and transmitting a modem-specific response from said modem to said control unit;

(e) comparing said modem-specific response from said currently-used modem to the stored modem-specific response for the modem-specific transmission sequence transmitted to the currently-used modem; and repeating steps (d) and (e) until agreement is found between the modem-specific response from said currently-used modem and the stored modem-specific response for the modem-specific transmission sequence transmitted to the currently-used modem, and thereupon storing the modem type in said modem detect memory corresponding to the modem-specific transmission sequence producing the modem-specific response for which agreement was found, or until all of said modem-specific transmission sequences have been transmitted and no agreement has been found.

3. A method as claimed in claim 1 comprising the additional steps, after obtaining and storing information corresponding to the modem type of the currently-used modem and before initializing said currently-used modem, of:

displaying an identification of the modem type of said currently-used modem accompanied by an acoustic signal; and conducting a preselect procedure wherein a plurality of modem-specific program functions necessary for initialization of said currently-used modem and for setting up a communication with said central data station, are executed.

4. A method as claimed in claim 1 wherein the step of initializing said currently-used modem includes dialing said central data station, and comprising the additional steps of:

testing said terminal apparatus, before initializing said currently-used modem and dialing said data central station, whether initialization of said currently-used modem and dialing of said central data station can be executed without error; and displaying a modem initialization error if no recognizable modem is in electrical communication with said control unit or if said currently-used modem is not ready for operation.

5. A method as claimed in claim 4 comprising the additional steps of:

interrogating said modem detect memory in successive steps to identify a modem type stored therein;

upon identifying a modem type stored in said modem detect memory, conducting an interface initialization, controlled by said control unit, matched to said modem type for subsequently producing a dialing sequence for dialing the central data station via the modem type identified from said modem detect memory; and if no modem type is recognized in said modem detect memory, entering into an error identification routine for identifying if a source of error is present.

6. A method as claimed in claim 5 wherein said control unit conducts said interface initialization before initializing said currently-used modem, and wherein the step of conducting said interface initialization includes the step of, if no modem type is recognized in said modem detect memory, conducting said interface initialization corresponding to a predetermined one of said modem types.

7. A method as claimed in claim 5 comprising the additional step of non-volatile storing a plurality of interface initialization allocations including the recognized modem type, and internal modem of an input/output control module in said terminal equipment, and a baud rate of each modem type, and wherein the step of conducting an interface initialization comprises conducting an interface initialization corresponding to a selected one of said interface initialization allocations.

8. A method as claimed in claim 1 comprising the additional steps of:

before initializing said currently-used modem, assembling in said control unit a dialing sequence for dialing said central data station via said currently-used modem; and dialing said central data station using said dialing sequence after initializing said currently-used modem.

9. A method as claimed in claim 1 wherein said terminal equipment includes an input unit having a plurality of actuatable input elements, and wherein the step of initializing said currently-used modem comprises the steps of:

checking via said control unit to determine whether a predetermined actuation element has been actuated and, if so, manually entering initialization and dialing information via said input unit and said control unit then initializing said currently-used modem and dialing said central data station according to said manually entered information; and if said predetermined actuation element has not been actuated, checking via said control unit to determine whether a further predetermined actuation element has been actuated and, if so, said control unit automatically compiling an initialization and dialing sequence for dialing said central data station via a variable modem as said currently-used modem.

10. A method for automatically recognizing a modem type connected to a terminal apparatus and for adapting the terminal apparatus to the recognized modem type, in a terminal apparatus which communicates with a remote central data station, the terminal apparatus having a control unit and a currently-used modem in electrical connection via an interface with said control unit, said currently-used modem being of a modem type among a plurality of different modem types, said method comprising the steps of:

entering into a communication mode between said terminal apparatus and said central data station in which data is to be transmitted via said currently-used modem, for which initialization of said currently-used modem and said interface by said control unit is required;

after entry into said communication mode and before initialization of said currently-used modem, identifying, via said control unit, the modem type of said currently-used modem by interrogating a modem detect memory to determine if information corresponding to the modem type of said currently-used modem is in said modem detect memory;

initializing said currently-used modem and said interface according to the modem type of said currently-used modem; and exiting said communication mode.

11. A terminal apparatus having a control unit, a currently-used modem, and interface and an input unit having a plurality of actuatable input elements, wherein the control unit is in electrical communication with the currently-used modem via the interface, the currently-used modem having a modem type among a plurality of different modem types, the improvement comprising:

said input unit having a predetermined actuation element for, upon actuation, causing said control unit to enter into a communication mode placing said terminal apparatus and said central data station in communication in which data is to be transmitted via said currently-used modem and said interface, for which initialization of said currently-used modem and initialization of said interface are required;

a modem detect memory in which information corresponding to each of the different modem types is stored;

said control unit comprising means, after entry into said communication code and before initialization of said currently-used modem and said interface, for interrogating said modem detect memory and interacting with said currently-used modem to identify the modem type of said currently-used modem;

upon identification of said modem type of said currently-used modem, initializing said currently-used modem and initializing said interface corresponding to the modem type of said currently-used modem; and exiting said communication mode.

12. The improvement of claim 11 wherein said modem detect memory comprises means for storing a plurality of modem-specific transmission sequences as said information respectively corresponding to said different modem types, and wherein said control unit comprises means for causing sequential transmission of said modem-specific transmission sequences from said modem detect memory to said currently-used modem and for evaluating a modem-specific response of said currently-used modem to each modem-specific transmission sequence for identifying said modem type of said currently-used modem.

13. The improvement of claim 11 wherein said modem detect memory comprises means for storing a transmission sequence for a variable modem configuration.

14. The improvement of claim 11 wherein said input unit includes a further predetermined actuation element and wherein said control unit comprises means, upon activation of said further predetermined actuation element, for automatically initializing said currently-used modem and said interface according to stored information;

said input unit including an additional predetermined actuation element and said control unit comprising means, upon actuation of said additional predetermined actuation element, for enabling manual entry, via said input unit, of an initialization and dialing sequence uniquely adapted to said terminal equipment; and means for storing the manually entered initialization and dialing sequence.

* * * * *